United States Patent [19]

Standley

[11] 4,255,146
[45] Mar. 10, 1981

[54] ENDLESS POWER TRANSMISSION BELT AND METHOD OF MAKING SAME

[75] Inventor: Paul M. Standley, Springfield, Mo.

[73] Assignee: Dayco Corporation, Dayton, Ohio

[21] Appl. No.: 47,539

[22] Filed: Jun. 11, 1979

[51] Int. Cl.³ .............................................. F16G 5/16
[52] U.S. Cl. ................................... 474/251; 474/265
[58] Field of Search .................... 74/231 C, 232, 233, 74/234; 474/249-251, 265

[56] References Cited

U.S. PATENT DOCUMENTS

| | | | |
|---|---|---|---|
| 1,457,569 | 6/1923 | Gusdorf | 74/234 |
| 2,405,496 | 8/1946 | Gingras | 74/233 |
| 2,461,169 | 2/1949 | Miller | 74/233 |
| 2,983,637 | 5/1961 | Schmidt | 74/232 |
| 3,103,703 | 9/1963 | Ludewig | 74/231 C |
| 3,738,188 | 6/1973 | Ray | 74/234 |
| 3,776,054 | 12/1973 | Shichman et al. | 74/233 |
| 4,002,082 | 1/1977 | Waugh | 74/231 C |

FOREIGN PATENT DOCUMENTS

| | | | |
|---|---|---|---|
| 469998 | 1/1929 | Fed. Rep. of Germany | 74/234 |
| 24370 | of 1914 | United Kingdom | 74/234 |

*Primary Examiner*—Lawrence J. Staab
*Attorney, Agent, or Firm*—Charles E. Bricker

[57] ABSTRACT

An endless power transmission belt and method of making same are provided wherein such belt (which may be a toothed belt) is made primarily of polymeric material comprising a compression section having opposed sides and means for stress relief of the belt during operation thereof around associated sheaves and wherein the stress-relief means comprises a plurality of cavities extending into the compression section from each of the sides with each of the cavities defining a corresponding roughly concave surface, each concave surface has a top arcuate portion opening downwardly toward the inner surface of the belt and a bottom arcuate portion opening outwardly toward its associated side with the cavities providing stress relief by minimizing cracking tendencies in the compression section of the belt while reducing the aggressiveness of the belt during operation thereof around the sheaves.

16 Claims, 12 Drawing Figures

ENDLESS POWER TRANSMISSION BELT AND METHOD OF MAKING SAME

BACKGROUND OF THE INVENTION

1. Field of the Invention

This invention relates to an endless power transmission belt and method of making same wherein such belt is made primarily of polymeric material.

2. Prior Art Statement

Polymeric endless power transmission belts of trapezoidal cross-sectional configuration, known popularly as V-belts, are widely used in industry. In many applications the belts are required to transmit comparatively large torques as well as operate around comparatively small diameter pulleys or sheaves whereby such belts of necessity must have both high strength and flexibility; and belts of this type usually operate with high internal stresses which tend to cause excessive heating of the belts during operation resulting in premature failure. Accordingly, many types of belts and belt manufacturing techniques have been proposed heretofore in efforts to provide high performance belts which operate with minimum internal stresses.

For example, U.S. Pat. No. 3,995,507 discloses an endless power transmission belt having comparatively large load-carrying capacity, flexibility, and means providing operation in a stress relieved manner. U.S. Pat. No. 3,464,875 discloses a typical belt similar to the numerous toothed belts proposed heretofore, and such belt has improved flexibility due to its toothed compression section. Finally, U.S. Pat. No. 2,405,496 discloses a belt which is provided with V-shaped notches in its pliable outer covering in an effort to minimize belt heating during operation.

However, because of the highly competitive nature of the belt making industry, the need still exists for a high performance endless power transmission belt which is comparatively free of operating stresses and is cool running.

SUMMARY

It is a feature of this invention to provide a high performance endless power transmission belt made primarily of polymeric material which has improved stress-relief means therein, operates with minimum cracking tendencies, and operates with reduced aggressiveness around associated sheaves whereby such belt is comparatively cool running.

Another feature of this invention is to provide a polymeric endless power transmission belt comprising a compression section having opposed sides and means for stress relief of the belt during operation thereof around associated sheaves with the stress-relief means comprising a plurality of cavities extending into the compression section from each of the sides with each of the cavities defining a corresponding roughly concave surface and each concave surface having a top arcuate portion opening downwardly toward the inner surface of the belt and a bottom arcuate portion opening outwardly toward its associated side with the cavities providing stress relief by minimizing cracking tendencies in the compression section of the belt.

Another feature of this invention is to provide a belt of the character mentioned having cavities therein provided in cooperating pairs along the belt with each cooperating pair of cavities being on opposite ends of a rectilinear line disposed perpendicular to a longitudinal axis of the belt.

Another feature of this invention is to provide a belt of the character mentioned which is in the form of a toothed or cog-type belt wherein the compression section thereof has a toothed portion defining the inner portion of such belt and the toothed portion is defined by alternating projections and recesses and with each cooperating pair of cavities defining a pair of enlargements at opposite ends of an associated recess.

Another feature of this invention is to provide a belt of the character mentioned in which each cavity is a roughly semiparaboloidal cavity.

Another feature of this invention is to provide an improved method of making an endless power transmission belt of the character mentioned.

Therefore, it is an object of this invention to provide an improved endless power transmission belt and method of making same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DETAILED DESCRIPTION

Figure 1:
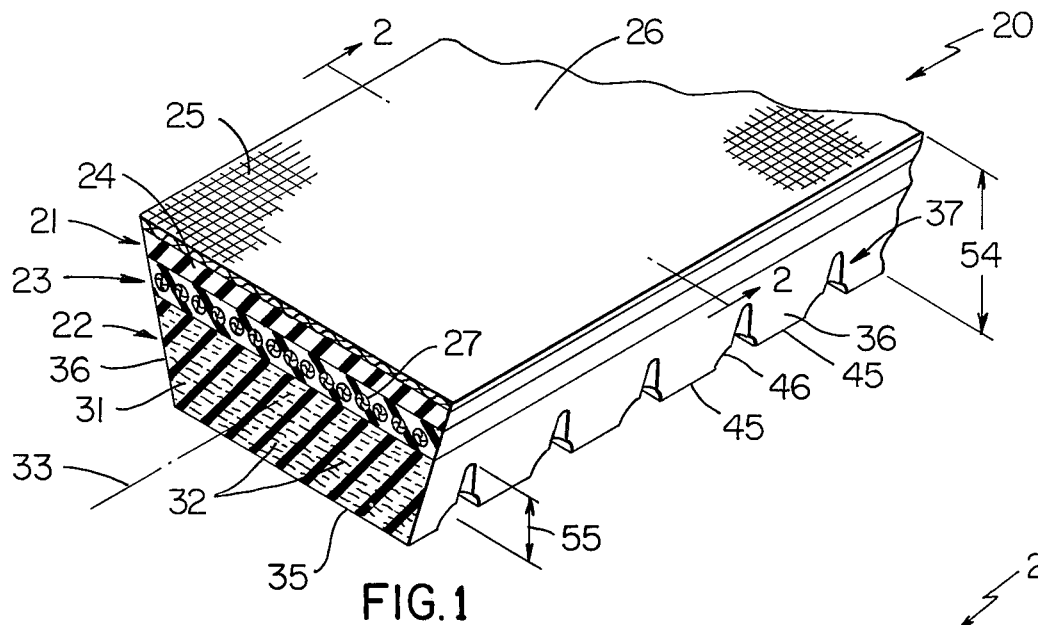
FIG. 1 is a perspective view with parts in cross-section, parts in elevation, and parts broken away of one exemplary embodiment of an endless power transmission belt of this invention.
Figure 2:
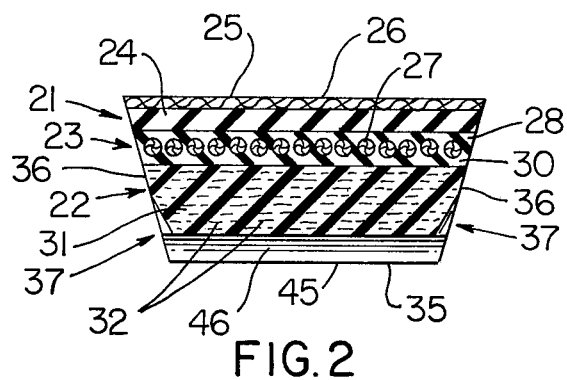
FIG. 2 is a cross-sectional view taken essentially on the line 2—2 of FIG. 1.

Reference is now made to FIG. 1 of the drawings which illustrates one exemplary embodiment of an endless power transmission belt of this invention which is designated generally by the reference numeral 20. The belt 20 of this example is in the form of a so-called cog-type or toothed belt which has a toothed compression section as will be described subsequently. The belt has unique stress-relief means in accordance with the teachings of this invention which minimizes cracking tendencies in the compression section of the belt while reducing the aggressiveness of the belt during operation thereof around associated sheaves thereby resulting in belt 20 being comparatively cool running belt.

The belt 20 is of trapezoidal cross-sectional configuration and in this example is shown having a width which is large when compared to its thickness; and, such belt is of the type employed to operate heavy industrial equipment. However, it will be appreciated that the concept of this invention may be utilized in providing an endless power transmission belt for all types of uses where endless power transmission belts are employed.

The belt 20 comprises a tension section 21, a compression section 22, and a load-carrying section 23 bonded in a sandwiched manner between the tension and compression sections 21 and 22 respectively. The belt 20 is made primarily of polymeric material in the form of an elastomeric material and in this example of the invention major portions of such belt are shown by cross-hatching in the drawings as being made of rubber.

The tension section 21 comprises a polymeric material 24 and has a fabric cover 25 suitably bonded thereagainst using techniques known in the art. The outside surface of the cover 25 defines which is commonly referred to as the outside surface 26 of the belt 20.

The load-carrying section 23 may be made using suitable materials of all types known in the art; however, in this example the load-carrying section is comprised of a helically wound load-carrying cord 27 preferably made of a comparatively inextensible material which is bonded to the usual cushion material shown as a top cushion 28 adjoining the tension section 21 and a bottom cushion 30 adjoining the compression section 22.

The compression section 22 of this example is made of a suitable rubber material 31 which has reinforcing means in the form of reinforcing fibers 32 suitably embedded therein and the rubber material 31 serves as a matrix for the reinforcing fibers 32. The fibers 32 may be of any suitable type known in the art and in this example of the invention the fibers are disposed transverse and preferably perpendicular to the central longitudinal axis 33 of the belt 20.

Figure 4:
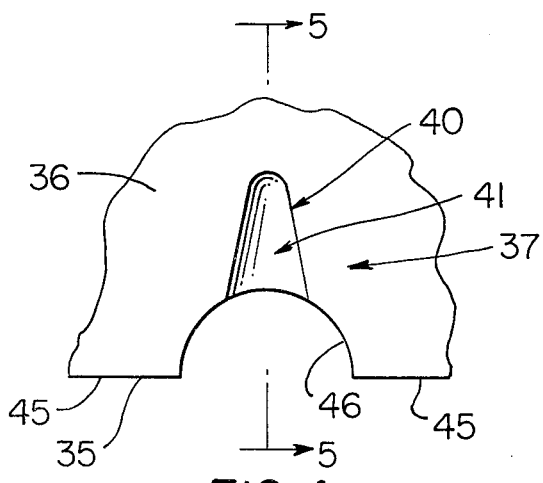
FIG. 4 is an enlarged view looking perpendicularly toward a typical cavity extending into the compression section of one side of the belt of FIG. 1.
Figure 5:
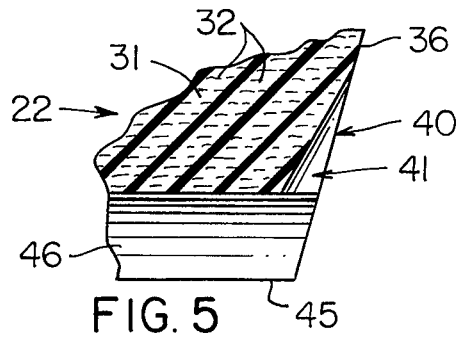
FIG. 5 is a fragmentary cross-sectional view taken essentially on the line 5—5 of FIG. 4.

As mentioned earlier, the trapezoidal belt 20 has a fabric layer 25 the outside surface of which defines the top or outside surface 26 of the belt. The inside surface of the belt, which is the outermost surface of the compression section 22 is designated by the reference numeral 35 and in this example is free of covering. The belt 20 also has opposed sides each designated generally by the same reference numeral 36 which are also free of covering whereby such belt is a so-called row-edged belt. The belt 20 has stress-relief means designated generally by the reference numeral 37 in FIG. 1 and such stress-relief means is provided in the compression section 22. The stress-relief means 37 comprises a plurality of cavities each of which extends into the compression section and each cavity is designated by the same general reference numeral 40 with a typical cavity being illustrated in each of FIGS. 4 and 6.

Figure 6:
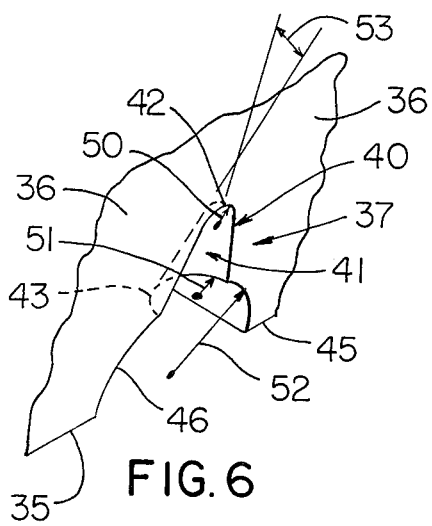
FIG. 6 is a fragmentary view of a typical cavity shown in perspective to highlight details of the configuration thereof.
Figure 7:
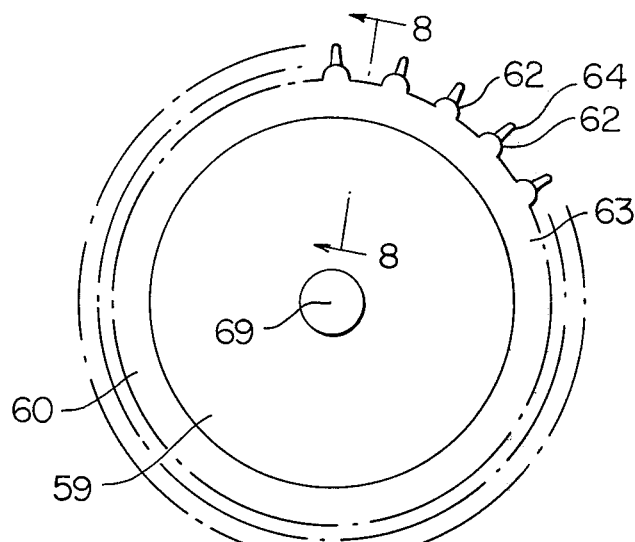
FIGS. 7 through 10 illustrate a series of typical method steps which may be employed in making the belt of FIG. 1.
Figure 8:
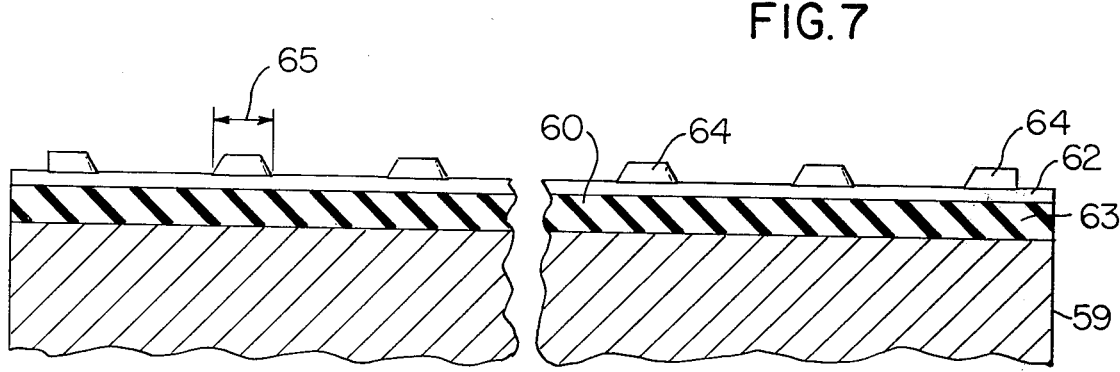
Figure 9:
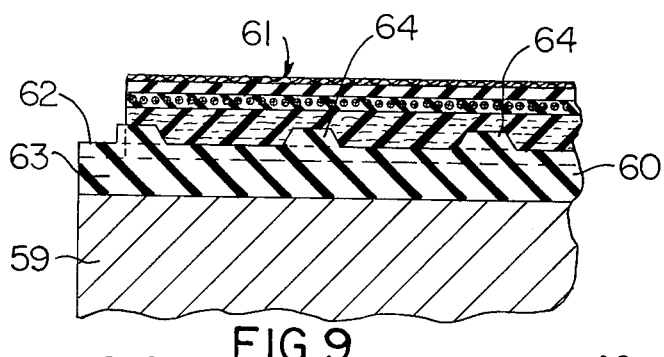

Each cavity 40 extends into the compression section 22 from an associated side 36 of the belt and each cavity defines a corresponding roughly concave surface 41 as shown in FIG. 6. Each concave surface 41 has a top arcuate portion 42 opening downwardly toward the inner surface 35 of the belt and a bottom arcuate portion 43 opening outwardly toward its associated side 36.

In accordance with the teachings of this invention the cavities 40 provide stress-relief for the belt and in particular for the compression section thereof during belt operation around associated sheaves or pulleys by minimizing cracking tendencies in the compression section of the belt and such cavities also reduce the aggressiveness of the belt during operation thereof around the sheaves, thereby resulting in a comparatively cool running belt. The minimizing of cracking tendencies is achieved because the cavities 40 have smooth arcuate surfaces which blend smoothly with the remainder of the compression section. The reduction in the aggressiveness of the belt is due to the fact that a comparatively smaller surface area of the belt sides engages associated sheaves resulting in less contact between each belt and its sheaves.

The belt 20 of this example is a so-called cog-type or toothed belt and thus has a toothed inner portion with the toothed portion defining the outer part of the compression section 22. The toothed portion is defined by alternating projections 45 and recesses 46 as will now be described. Each recess 46 of the belt 20 is a substantially semi-cylindrical recess 46 (FIGS. 3 and 4) and the recesses 46 and projections 45 are disposed transverse, preferably perpendicular, to the longitudinal axis 33 of the belt 20.

Each of the semicylindrical recesses 46 has a cooperating pair of cavities 40 at its opposite ends; and, in this example of the belt 20 each cooperating pair of cavities 40 is disposed at opposite ends of an associated recess 46 and hence at opposite ends of a rectilinear line disposed perpendicular to a longitudinal axis of the belt. The above-mentioned rectilinear line is a line at the apex or the innermost portion of the concave surface defining each semicylindrical recess 46.

Each cavity 40 is, in essence, a half cavity and may be considered an inverted semiconcavity. Each cavity 40 may be of any suitable configuration having smooth surfaces which blend smoothly with the remainder of the compression section; however, preferably each cavity 40 is a roughly semiparaboloidal cavity. In this particular example each cavity 40 is defined by roughly one-half of a paraboloid of revolution; and, a paraboloid of revolution is defined by a parabola which is rotated about its central axis.

Referring now to FIG. 6 of the drawings, it is seen that the top arcuate portion 42 intersects its associated belt side 36 on a first radius 50 and the bottom arcuate portion 43 extends into the compression section on a second radius 51 wherein the first radius 50 has a length which is less than the length of the second radius 52. Preferably the first radius 50 has a length which ranges between roughly one-fourth and one-half the length of the second radius. It will also be seen that each semicylindrical recess 46 has a third radius 52 and the relationship of these radii is such that the second radius 51 has a length which ranges roughly between one-fourth and one-half the length of the third radius 52, and the first radius 50 has a length which ranges roughly between one-eighth and one-fourth the length of the third radius 52.

As indicated earlier each cavity 40 is preferably semiparaboloidal cavity 40 in the form of a paraboloid of revolution. The axis of rotation of such paraboloid of revolution is disposed at an angle 53 (FIG. 6) with respect to the inclination or angle of the side 37 and the angle 53 may range between 5° and 60° from the angle of inclination of the belt side 37.

The belt 20 may be of the heavy industrial type and such a belt has an overall thickness 54, as indicated in FIG. 1. The apex of the top arcuate portion 42 of the concave surface 41 is such that it is disposed a distance 55 which may range between one-fourth to two-thirds of the thickness 54 of the belt.

Figure 3:
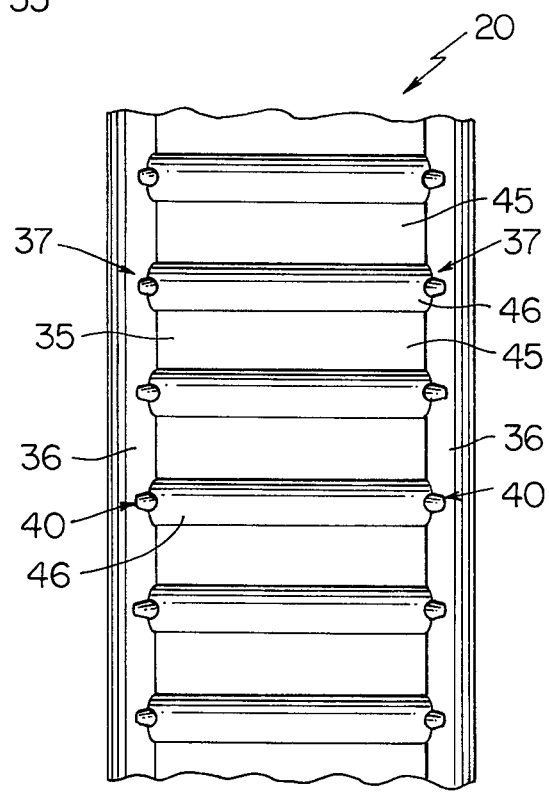
FIG. 3 is a plan view looking perpendicularly toward a straight section of the inside surface of the belt of FIG. 1.

The cavities 40 provided at opposite ends of each recess 46 are defined as cooperating pairs. Each cooperating pair of cavities, in essence, defines a pair of symmetrical enlargements at opposte ends of its associated semicylindrical recess and as shown in FIG. 3. The cavities 40 are preferably provided so that the top arcuate portion 42 of each is disposed beneath the bottom cushion 30 of the load-carrying section 23.

Figure 11:
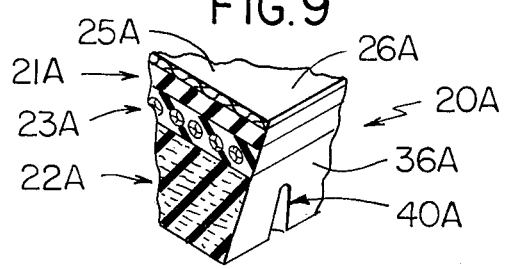
FIG. 11 is a fragmentary perspective view similar to the right forward corner of the belt of FIG. 1 illustrating another exemplary embodiment of the belt of this invention.

Another exemplary embodiment of a polymeric endless power transmission belt of this invention is illustrated in FIG. 11 of the drawing. The belt of FIG. 11 is very similar to belt 20; therefore, such belt will be designated by the reference numeral 20A and representative parts of such belt which are similar to corresponding parts of the belt 20 will be designated in the drawings by the same reference numeral as in the belt 20 followed by the letter designation A and not described again in detail.

The main difference between the belt 20A and the belt 20 is that the belt 20A is of trapezoidal cross-section and is free of teeth, i.e., belt 20A does not have a toothed compression section. Accordingly, it will be seen that the belt 20A also has a tension section 21A, a compression section 22A, and a load-carrying section 23A disposed in sandwiched relation between the tension and compression sections. The belt also has a top cover 25A which defines the outside surface 26A of the belt and has opposed sides 36A with cavities 40A in the compression section 22A which are substantially identical to the cavities 40 previously described for the belt 20.

The cavities 40A are provided in cooperating pairs of cavities with each pair being disposed on opposite sides of a rectilinear line disposed perpendicular to the longitudinal axis 33A of the belt. The cavities 40A of the belt 20 serve as previously described to provide stress-relief for the overall belt 20A by minimizing cracking tendencies of the compression section 22A and reducing the aggressiveness of the belt during operation thereof around associated sheaves thereby resulting in belt 20A also being comparatively cool running.

Each belt of this invention may be made utilizing any suitable method known in the art and the detailed description will now proceed with method steps which may be employed in making the belt 20; and, for this description reference is made to FIGS. 7 through 10 of the drawings.

The belt 20 may be made employing a suitable buildup drum 59 (FIG. 7) around which a reusable cylindrical polymeric matrix pad or sleeve 60 is disposed as is known in the art. The tubular matrix pad 60 is of unique construction, which will be described subsequently, and the drum 59 and pad 60 are used to define a belt sleeve 61 (FIGS. 9 and 10) from which individual belts 20 are cut.

The tubular matrix pad 60 has a plurality of equally angularly spaced roughly semicylindrical projections 62 comprising same which extend radially outwardly from the main part 63 of the pad 60. The projections 62 define the semicylindrical recesses 46 in each belt 20 and the projections are disposed parallel to the longitudinal axis 69 of the drum 59.

The matrix pad 60 also has a plurality of projections 64 provided at spaced intervals along each semicylindrical projection 62. Each projection 64 is used to define a pair of substantially identical cavities 40 for an adjoining pair of belts 20 which are cut from the sleeve 61.

Each projection 64 has a configuration and length 65 (FIG. 8) which enables defining of a pair of cavities 40 while still providing sufficient space 67 therebetween (FIG. 10) to allow cutting of a pair of immediately adjacent belts 20 with the desired angle for the non-parallel sides 37 thereof. The cutting of belts 20 may be achieved employing a suitable cutting tool 70 which is shown schematically in FIG. 10.

The use of a tubular reuseable polymeric matrix pad 60 for forming a belt sleeve 61 therearound is known in the art and the detailed description for forming such a sleeve will not be presented herein. After forming of the belt sleeve 61 such sleeve is cured and cooled using apparatus and techniques known in the art.

Figure 10:
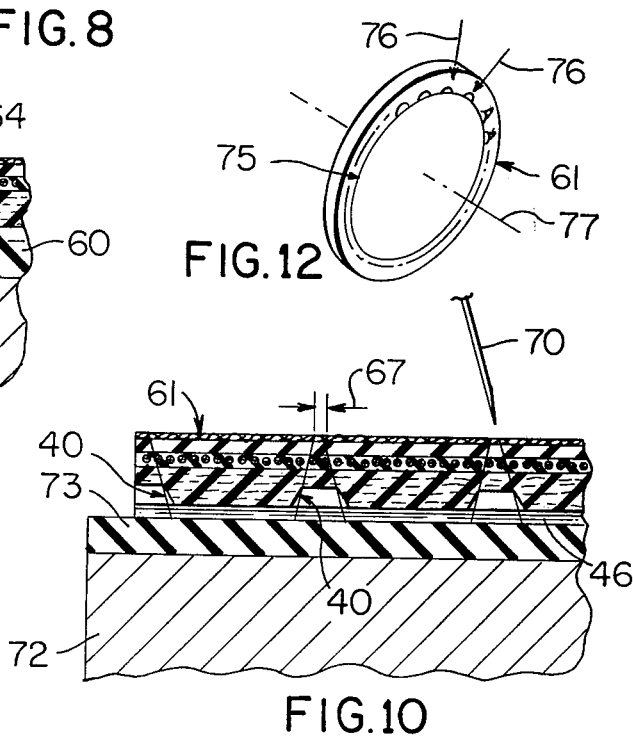

After curing and cooling of the belt sleeve 61, the sleeve 61 together with its reuseable matrix pad 60 are removed from the build-up drum 59. The matrix pad 60 is then collapsed within the confines of the belt-defining sleeve 61 and the sleeve 61 is placed on a suitable rotatable cutting mandrel 72, which has a yieldable tubular anvil 73, for cutting of individual belts 20 therefrom. The cutting may be achieved utilizing techniques which are well known in the art; and, it will be appreciated that in cutting individual belts as shown in FIG. 10 it is necessary to locate the center between immediately adjacent belts and this may be achieved utilizing techniques known in the art. It will also be appreciated that instead of cutting the belt sleeve 61 right side out as shown in FIG. 10 the belt sleeve 61 may be turned inside out and cut on the cutting mandrel 72 thereby facilitating the cutting action so that a pair of cavities 40 of the required size and configuration are provided in a symmetrical manner at opposite ends of each associated recess 46.

Other types of collapsible mandrels may be employed in making a plurality of belts 20. For example, a collapsible metal mandrel having an outside configuration similar to the matrix pad 60 may be used to give the inside surface of each belt 20 a so-called plate finish, or any other desired finish.

The curing of the belt defining sleeve 61 may be achieved in a curing apparatus of any suitable type known in the art and the curing may be achieved by employing steam under pressure in a so-called pot heater and circulating such steam around the belt defining sleeve and its supporting drum. Following curing, the cured sleeve 61 may then be suitably cooled employing any suitable cooling medium. For example, the sleeve 61 and its pad 60 and drum 59 may be submerged in a container containing circulating cold tap water, or the like. Following cooling the sleeve 61 is removed and cut as previously described.

Figure 12:
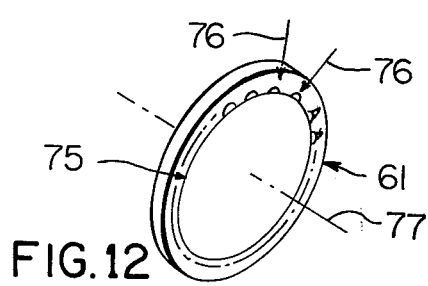
FIG. 12 illustrates a key method step of another series of steps which may be used in making the belt of FIG. 1.

The belt 20 may be made utilizing apparatus and techniques which are known in the art to define a belt sleeve having a toothed inner portion whereupon such toothed sleeve may be cut to define a plurality of belts each being basically a standard well known cog-type or toothed belt. Each of such standard belts is then disposed on a special rotatable cutting fixture 75 as shown in FIG. 12 and a pair of suitable cutting devices each shown schematically by an arrow 76, is employed to define cavities 40 at opposite sides of the belt. The cutting action may be achieved by indexing fixture 75 about its axis of rotation 77 past the cutting devices 75. Each cutting device may be of any suitable type known in the art including a suitable mechanical cutting tool, a grinder, a laser beam, or the like.

It will also be appreciated that the belt 20A may be defined in a similar manner as belt 20 utilizing similar method steps, apparatus, and techniques whereby a detailed description of the making of belt 20A will not be presented.

The endless power transmission belt of this invention may be made in various modified forms. For example, various types of polymeric material may be employed in the compression section as well as the other sections. In addition, the compression section may be comprised of a plurality of different polymeric materials each having special properties. Similarly, it is to be understood that other reinforcing materials, other than elongate reinforcing fibers, may be employed in the compression section of the belt, including fabric layers of the various types employed in the art.

Each belt of this invention has been shown provided with a fabric cover defining the outside surface thereof; however, it is to be understood that a fabric cover may be provided to define the inner surface 35 thereof, as desired.

While present exemplary embodiments of this invention, and methods of practicing the same, have been illustrated and described, it will be recognized that this invention may be otherwise variously embodied and practiced within the scope of the following claims.

What is claimed is:

1. In an endless power transmission belt made primarily of polymeric material and comprising; a compression section; a load-carrying section bonded against said compression section; and a tension section bonded against said load-carrying section; said compression section having opposed sides and means for stress relief of said belt during operation thereof around associated sheaves; the improvement wherein such stress-relief means comprises, a plurality of cavities disposed between said load-carrying section and the inner surface of said belt, said cavities extending into said compression section from each of said sides with each of said cavities defining a corresponding roughly concave surface, each concave surface having a top arcuate portion opening downwardly toward the inner surface of said belt and a bottom arcuate portion opened outwardly toward its associated side, said cavities providing said stress relief by minimizing cracking tendencies in said compression section of said belt and reducing the aggressiveness of said belt during operation thereof around said sheaves resulting in a comparatively cool running belt, said cavities being disposed in cooperating pairs along said belt, each cooperating pair of cavities being on opposite ends of a rectilinear line disposed perpendicular to a longitudinal axis of said belt, said top arcuate portion intersecting its associated belt side on a first radius with said bottom arcuate portion extending into said compression section on a second radius which is greater in length than said first radius.

2. A belt as set forth in claim 1 in which said first radius has a length which ranges between roughly one-fourth and one-half the length of said second radius.

3. A belt as set forth in claim 1 wherein said compression section has a toothed portion defining the inner portion of said belt, said toothed portion being defined by alternating projections and recesses, and each cooperating pair of cavities defines a pair of enlargements at opposite ends of an associated recess.

4. A belt as set forth in claim 3 in which each of said recesses has an associated cooperating pair of cavities at its opposite ends.

5. A belt as set forth in claim 3 in which each of said recesses is a roughly semicylindrical recess.

6. A belt as set forth in claim 5 in which each cavity is a roughly semiparaboloidal cavity.

7. A belt as set forth in claim 5 in which each cavity is defined by roughly one-half of a paraboloid of revolution.

8. A belt as set forth in claim 3 in which each of said recesses is a roughly semicylindrical recess having a third radius wherein said second radius has a length which ranges between roughly one-fourth to one-half the length of said third radius and said first radius has a length which ranges between one-eighth to one-fourth the length of said first radius.

9. A belt as set forth in claim 8 in which each cavity is a roughly semiparaboloidal cavity which is inclined at an angle to its associated belt side.

10. A belt as set forth in claim 9 in which each semiparaboloidal cavity is inclined at an angle to its associated belt side ranging between 5° and 60°.

11. A belt as set forth in claim 3 in which the total vertical height from the inside surface of the belt to the uppermost extremity of said first radius comprising the top arcuate portion of each cavity ranges between one-fourth to two-thirds the total thickness of said belt.

12. In a method of making an endless power transmission belt primarily of polymeric material, said belt having a compression section, a load-carrying section bonded against said compression section, and a tension section bonded against said load-carrying section; said method comprising the steps of; providing said compression section having opposed sides and providing stress-relief means in said belt enabling relief of stresses therein during operation thereof around associated sheaves; the improvement in said step of providing stress-relief means comprising the step of forming a plurality of cavities between said load-carrying section and the inner surface of said belt by extending said cavities into said compression section from each of said sides with each of said cavities defining a corresponding roughly concave surface, each concave surface having a top arcuate portion opening downwardly toward the inner surface of said belt and a bottom arcuate portion opening outwardly toward its associated side, said cavities providing said stress relief by minimizing cracking tendencies in said compression section of said belt and reducing the aggressiveness of said belt during operation thereof around said sheaves resulting in a comparatively cool running belt, said cavities being formed during said forming step in cooperating paris along said belt, each cooperating pair of cavities being on opposite ends of a rectilinear line disposed perpendicular to a longitudinal axis of said belt, said cavities being formed so that each concave surface has its top arcuate portion intersecting its associated belt side on a first radius with said bottom arcuate portion extending into said compression section on a second radius which is greater in length than said first radius.

13. A method as set forth in claim 12 in which said forming step comprises molding said cavities in a belt-defining sleeve and comprising the further step of cutting said sleeve to define the final configuration of each cavity.

14. A method as set forth in claim 12 in which said forming step comprises cutting said cavities in said belt with a cutting tool.

15. In a method of making endless power transmission belts primarily of polymeric material and comprising the steps of; providing a belt-defining sleeve; cutting said sleeve to define a plurality of belts; each of said belts having a compression section, a load-carrying section bonded against said compression section, and a tension section bonded against said load-carrying section; said compression section of each belt having opposed sides; and providing stress-relief means in each belt enabling relief of stresses therein during operation thereof around associated sheaves; the improvement in said step of providing stress-relief means in each belt comprising the step of, forming a plurality of cavities between the load-carrying section and the inner surface of each belt by extending said cavities in the compression section of each of said belts inwardly from each of its sides with each of said cavities defining a corresponding roughly concave surface, each concave surface having a top arcuate portion opening downwardly toward the inner surface of its belt and a bottom arcuate portion opening outwardly toward its associated side, said cavities in each belt providing said stress relief by minimizing cracking tendencies in the compression section of its belt and reducing the aggressiveness of its belt during operation thereof around its associated sheaves resulting in a comparatively cool running belt, said cavities in each belt being formed during said forming step in cooperating pairs along its belt, each cooperating pair of cavities being on opposite ends of a rectilinear line disposed perpendicular to a longitudinal axis of its belt, said cavities being formed so that each concave surface has its top arcuate portion intersecting its associated belt side on a first radius with said bottom arcuate portion extending into said compression section on a second radius which is greater in length than said first radius.

16. A method as set forth in claim 15 in which said step of forming a plurality of cavities in each belt comprises molding said cavities in said belt-defining sleeve prior to said step of cutting said sleeve.

* * * * *